US012735514B2

(12) United States Patent
Mizushima et al.

(10) Patent No.: US 12,735,514 B2
(45) Date of Patent: Sep. 15, 2026

(54) NUCLEATING AGENT COMPOSITION, OLEFIN-BASED RESIN COMPOSITION, MOLDED ARTICLE THEREOF, AND METHOD FOR PRODUCING OLEFIN-BASED RESIN COMPOSITION

(71) Applicant: ADEKA CORPORATION, Tokyo (JP)

(72) Inventors: Hiroaki Mizushima, Saitama (JP); Takuya Fukuda, Saitama (JP); Yuri Yokota, Saitama (JP)

(73) Assignee: ADEKA CORPORATION, Tokyo (JP)

(*) Notice: Subject to any disclaimer, the term of this patent is extended or adjusted under 35 U.S.C. 154(b) by 348 days.

(21) Appl. No.: 17/424,089

(22) PCT Filed: Jan. 21, 2020

(86) PCT No.: PCT/JP2020/001895
§ 371 (c)(1),
(2) Date: Jul. 19, 2021

(87) PCT Pub. No.: WO2020/153343
PCT Pub. Date: Jul. 30, 2020

(65) Prior Publication Data

US 2022/0119559 A1 Apr. 21, 2022

(30) Foreign Application Priority Data

Jan. 21, 2019 (JP) ................................ 2019-007628

(51) Int. Cl.

| | |
|---|---|
| ***C08F 110/06*** | (2006.01) |
| ***C07F 9/6574*** | (2006.01) |
| ***C08K 3/18*** | (2006.01) |
| ***C08K 5/053*** | (2006.01) |
| ***C08K 5/103*** | (2006.01) |
| ***C08K 5/527*** | (2006.01) |
| ***C08K 13/02*** | (2006.01) |
| ***C08L 23/12*** | (2006.01) |

(52) U.S. Cl.
CPC ........ *C08F 110/06* (2013.01); *C07F 9/65744* (2013.01); *C08K 13/02* (2013.01); *C08L 23/12* (2013.01); *C08K 3/18* (2013.01); *C08K 5/053* (2013.01); *C08K 5/103* (2013.01); *C08K 5/527* (2013.01); *C08L 2205/24* (2013.01)

(58) Field of Classification Search
CPC ... C07F 9/65744; C08K 5/0083; C08K 5/053; C08K 5/103; C08K 5/527; C08L 2205/24
See application file for complete search history.

(56) References Cited

U.S. PATENT DOCUMENTS 4,463,113 A * 7/1984 Nakahara .......... C07F 9/657181 252/400.1
2007/0244233 A1 10/2007 Hild et al.
(Continued)

FOREIGN PATENT DOCUMENTS

CN 102807685 A 12/2012
CN 103087401 A 5/2013
(Continued)

OTHER PUBLICATIONS

International Search Report for PCT/JP2020/001895 mailed on Apr. 14, 2020.
Written Opinion of the International Searching Authority for PCT/JP2020/001895 (PCT/ISA/237) mailed on Apr. 14, 2020.
Yoshihide et al., "Aqueous aromatic metal phosphate-type nucleating agent compositions with good storage stability," Database CA [Online] Chemical Abstracts Service, XP002807345, related to JP-2013-159623-A, Aug. 19, 2013, 2 pages.

*Primary Examiner* — Wenwen Cai
(74) *Attorney, Agent, or Firm* — Birch, Stewart, Kolasch & Birch, LLP

(57) ABSTRACT

Provided are: a nucleating agent composition, which can impart excellent crystallinity to an olefin-based resin and with which a molded article having excellent mechanical properties and transparency can be obtained; an olefin-based resin composition; a molded article of the same; and a method of producing an olefin-based resin composition. The nucleating agent composition contains a nucleating agent and an auxiliary agent. In this nucleating agent composition, the nucleating agent contains an aromatic phosphate metal salt represented by Formula (1) (wherein, $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum), the auxiliary agent is at least one selected from the group consisting of water and polyol compounds, and the content of the auxiliary agent is 1 to 10,000 parts by mass with respect to 100 parts by mass of the nucleating agent.

(1)

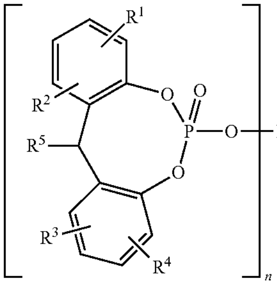

2 Claims, No Drawings

(56) References Cited

U.S. PATENT DOCUMENTS

| | | | | |
|---|---|---|---|---|
| 2009/0012224 | A1* | 1/2009 | Krohnke ................ | C08K 5/098 524/417 |
| 2013/0065994 | A1 | 3/2013 | Yokota et al. | |
| 2013/0172455 | A1* | 7/2013 | Tanji ........................ | C08K 5/52 524/108 |
| 2015/0152248 | A1 | 6/2015 | Kawamoto et al. | |

FOREIGN PATENT DOCUMENTS

| | | | |
|---|---|---|---|
| EP | 1 209 190 | A1 | 5/2002 |
| EP | 2 949 697 | A1 | 2/2015 |
| EP | 3 708 615 | A1 | 9/2020 |
| JP | 7-278448 | A | 10/1995 |
| JP | 7-286104 | A | 10/1995 |
| JP | 8-120116 | A | 5/1996 |
| JP | 2001-59040 | A | 3/2001 |
| JP | 2003-89734 | A | 3/2003 |
| JP | 2005-307138 | A | 11/2005 |
| JP | 2008-512535 | A | 4/2008 |
| JP | 2009-120800 | A | 6/2009 |
| JP | 2011-246589 | A | 12/2011 |
| JP | 2013-159623 | A | 8/2013 |
| JP | 2014-95046 | A | 5/2014 |
| JP | 2015-201616 | A | 11/2015 |
| JP | 2017-125116 | A | 7/2017 |
| JP | 2018-154794 | A | 10/2018 |
| WO | WO 2010/006999 | A1 | 1/2010 |
| WO | WO 2013/187240 | A1 | 12/2013 |

* cited by examiner

NUCLEATING AGENT COMPOSITION, OLEFIN-BASED RESIN COMPOSITION, MOLDED ARTICLE THEREOF, AND METHOD FOR PRODUCING OLEFIN-BASED RESIN COMPOSITION

TECHNICAL FIELD

The present invention relates to a nucleating agent composition, an olefin-based resin composition (hereinafter, also simply referred to as "resin composition"), a molded article of the same, and a method of producing an olefin-based resin composition. More particularly, the present invention relates to: a nucleating agent composition, which can impart excellent crystallinity to an olefin-based resin and with which a molded article having excellent mechanical properties and transparency can be obtained; an olefin-based resin composition; a molded article of the same; and a method of producing an olefin-based resin composition.

BACKGROUND ART

Olefin-based resins, such as polyethylene, polypropylene and polybutene-1, are inexpensive and have excellent properties in terms of moldability, hygiene, heat resistance, chemical resistance, mechanical characteristics, low specific gravity and the like; therefore, they are widely utilized in a variety of molded articles, such as building materials, automotive materials, materials of home electric appliances and electronics, fiber materials, packaging materials, agricultural materials, housing materials of home electric appliances, household miscellaneous goods, medical equipment, food containers, beverage containers, films, sheets, and structural components. However, olefin-based resins have problems of, for example, requiring a long molding cycle in processing due to a low crystallization rate after being heat-molded.

Today, for the purpose of improving the crystallinity of an olefin-based resin, a nucleating agent is added to allow rapid generation of fine crystals. In addition, it is known that an addition of a nucleating agent improves the transparency and the mechanical properties of a molded article obtained by molding an olefin-based resin.

Examples of such a nucleating agent used for improving the crystallinity of an olefin-based resin include metal carboxylates, aromatic phosphate metal salts, benzylidene sorbitol compounds, amide compounds, metal rosinates, and talc. Particularly, metal carboxylates, such as sodium benzoate, 4-tert-butylbenzoate aluminum salt, sodium adipate, and 2-sodium-bicyclo[2.2.1]heptane-2,3-dicarboxylate; aromatic phosphate metal salts, such as sodium-2,2'-methylene-bis(4,6-di-tert-butylphenyl)phosphate, lithium-2,2'-methylene-bis(4,6-di-tert-butylphenyl)phosphate, and aluminum hydroxy-bis[2,2'-methylene-bis(4,6-di-tert-butylphenyl) phosphate]; benzylidene sorbitol compounds, such as dibenzylidene sorbitol, bis(methylbenzylidene)sorbitol, bis(3,4-dimethylbenzylidene)sorbitol, bis(p-ethylbenzylidene) sorbitol, and bis(dimethylbenzylidene)sorbitol; and amide compounds, such as N,N,N'-tris[2-methylcyclohexyl]-1,2,3-propane tricarboxamide, N,N,N'-tricyclohexyl-1,3,5-benzene tricarboxamide, N,N-dicyclohexylnaphthalene dicarboxamide and 1,3,5-tri(2,2-dimethylpropaneamine)benzene, are known.

In recent years, there is a demand for further improvement in the performance of molded articles made of an olefin-based resin composition as their use is increasingly diversified. However, simple addition of an existing nucleating agent is not sufficient, and novel methods for improving the performance of molded articles made of an olefin-based resin composition have been investigated.

For example, Patent Documents 1 and 2 each disclose a method of producing an olefin-based resin composition, which method includes polymerizing an olefin monomer in the presence of a nucleating agent to prepare an olefin-based resin composition containing the nucleating agent, and subsequently incorporating water into the thus prepared olefin-based resin composition containing the nucleating agent.

RELATED ART DOCUMENTS

Patent Documents

[Patent Document 1] JP2014-095046A
[Patent Document 2] JP2017-125116A

SUMMARY OF THE INVENTION

Problems to be Solved by the Invention

However, molded articles made of the olefin-based resin composition produced by the production method disclosed in Patent Document 1 or 2 have room for improvement in terms of mechanical properties and transparency.

In view of the above, an object of the present invention is to provide: a nucleating agent composition, which can impart excellent crystallinity to an olefin-based resin and with which a molded article having excellent mechanical properties and transparency can be obtained; an olefin-based resin composition; a molded article of the same; and a method of producing an olefin-based resin composition.

Means for Solving the Problems

The present inventors intensively studied to solve the above-described problems and consequently discovered that the physical properties of a molded article composed of an olefin-based resin composition are markedly improved by using a combination of a specific aromatic phosphate metal salt and a specific auxiliary agent, thereby completing the present invention.

That is, a nucleating agent composition of the present invention contains a nucleating agent and an auxiliary agent, the nucleating agent composition being characterized in that:

the nucleating agent contains an aromatic phosphate metal salt represented by the following Formula (1):

(1)

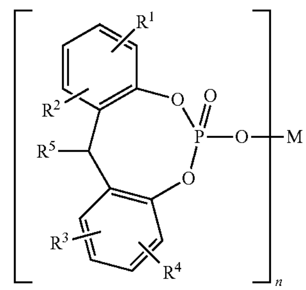

wherein, $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum;

the auxiliary agent is at least one selected from the group consisting of water and polyol compounds; and the content of the auxiliary agent is 1 to 10,000 parts by mass with respect to 100 parts by mass of the nucleating agent.

In the nucleating agent composition of the present invention, it is preferred that the polyol compounds be at least one selected from the group consisting of glycols, sugar alcohols, mono-fatty acid esters of sugar alcohols, and polyvinyl alcohols.

An olefin-based resin composition of the present invention contains an olefin-based resin, a nucleating agent, and an auxiliary agent, the olefin-based resin composition being characterized in that:

the nucleating agent contains an aromatic phosphate metal salt represented by the following Formula (1):

(1)

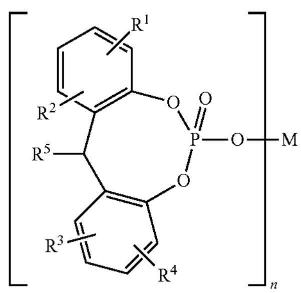

wherein, $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum;

the auxiliary agent is at least one selected from the group consisting of water and polyol compounds; and the olefin-based resin composition contains 0.001 to 5 parts by mass of the nucleating agent and 0.003 to 10 parts by mass of the auxiliary agent with respect to 100 parts by mass of the olefin-based resin.

In the olefin-based resin composition of the present invention, it is preferred that the polyol compounds be at least one selected from the group consisting of glycols, sugar alcohols, mono-fatty acid esters of sugar alcohols, and polyvinyl alcohols.

A molded article of the present invention is characterized in that it is obtained by molding the olefin-based resin composition of the present invention.

A method of producing an olefin-based resin composition according to the present invention includes:

a preparation step of preparing an olefin-based resin not containing a nucleating agent component; and a blending step of blending a nucleating agent and an auxiliary agent into the thus prepared olefin-based resin not containing a nucleating agent component to obtain an olefin-based resin blend, the method being characterized in that:

the nucleating agent contains an aromatic phosphate metal salt represented by the following Formula (1):

(1)

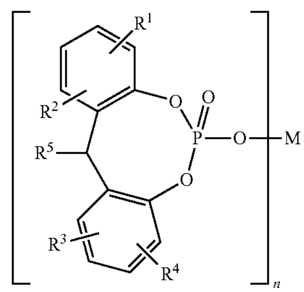

wherein, $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum;

the auxiliary agent is at least one selected from the group consisting of water and polyol compounds; and in the blending step, 0.001 to 5 parts by mass of the nucleating agent and 0.003 to 10 parts by mass of the auxiliary agent are blended with respect to 100 parts by mass of the olefin-based resin not containing a nucleating agent component.

The method of producing an olefin-based resin composition according to the present invention preferably further includes a melt-kneading step of melt-kneading the olefin-based resin blend obtained in the blending step to obtain an olefin-based resin composition.

Further, in the method of producing an olefin-based resin composition according to the present invention, it is preferred that the polyol compounds be at least one selected from the group consisting of glycols, sugar alcohols, mono-fatty acid esters of sugar alcohols, and polyvinyl alcohols.

Effects of the Invention

According to the present invention, the following can be provided: a nucleating agent composition, which can impart excellent crystallinity to an olefin-based resin and with which a molded article having excellent mechanical properties and transparency can be obtained; an olefin-based resin composition; a molded article of the same; and a method of producing an olefin-based resin composition.

MODE FOR CARRYING OUT THE INVENTION

Embodiments of the present invention will now be described in detail. First, the nucleating agent composition of the present invention will be described. The nucleating agent composition of the present invention contains a nucleating agent and an auxiliary agent. The nucleating agent contains an aromatic phosphate metal salt represented by the below-described Formula (1), and the auxiliary agent is at least one selected from the group consisting of water and polyol compounds. In the nucleating agent composition of the present invention, the content of the auxiliary agent is 1 to 10,000 parts by mass with respect to 100 parts by mass of the nucleating agent.

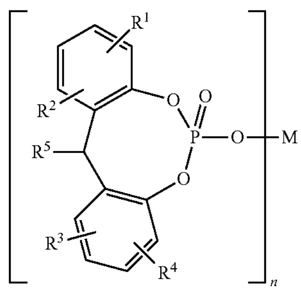

(1)

In Formula (1), $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum.

The nucleating agent composition of the present invention can impart excellent crystallinity to an olefin-based resin. In addition, by using the nucleating agent composition of the present invention, a molded article composed of an olefin-based resin, which has excellent mechanical properties and transparency, can be obtained.

As described above, the nucleating agent composition of the present invention contains a nucleating agent, and this nucleating agent contains an aromatic phosphate metal salt represented by Formula (1). Examples of the alkyl group having 1 to 6 carbon atoms that is represented by $R^1$ to $R^4$ in Formula (1) include methyl, ethyl, propyl, isopropyl, butyl, sec-butyl, tert-butyl, isobutyl, amyl, isoamyl, tert-amyl, hexyl, 2-hexyl, and 3-hexyl. Thereamong, tert-butyl provides an excellent nucleating effect and is thus preferred. Further, examples of the alkyl group having 1 to 3 carbon atoms that is represented by $R^5$ in Formula (1) include methyl, ethyl, propyl, and isopropyl.

Specific examples of the aromatic phosphate metal salt represented by Formula (1) include compounds represented by the following chemical formulae.

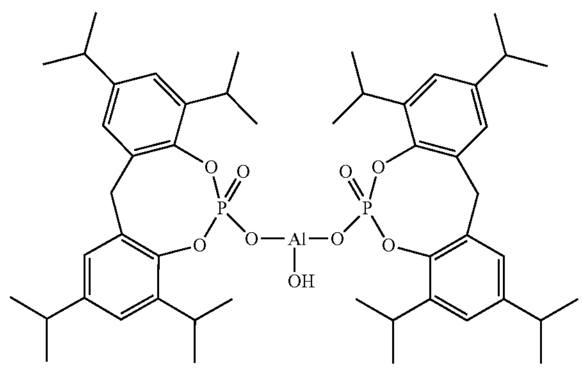

-continued

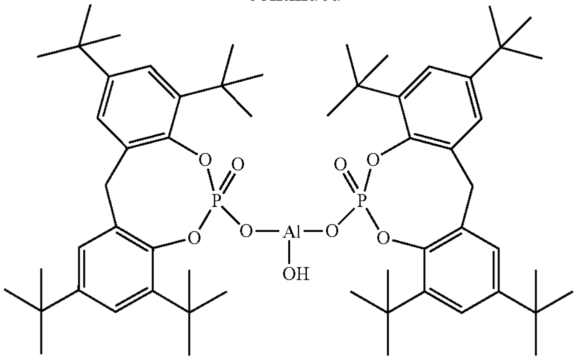

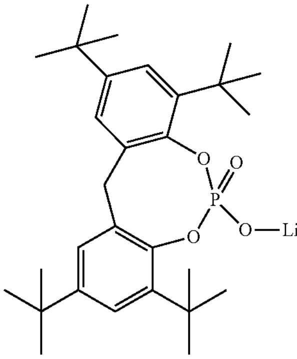

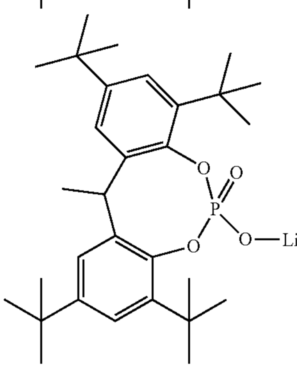

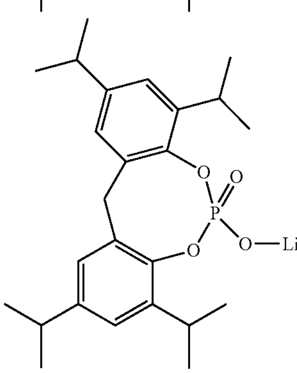

The nucleating agent contained in the nucleating agent composition of the present invention may also contain a compound different from the aromatic phosphate metal salt represented by Formula (1). Examples of the compound different from the aromatic phosphate metal salt represented by Formula (1) include: metal carboxylates, such as sodium-2,2'-methylene-bis(4,6-di-tert-butylphenyl)phosphate, sodium benzoate, aluminum 4-tert-butylbenzoate, sodium adipate, 2-sodium-bicyclo[2.2.1]heptane-2,3-dicarboxylate, and calcium cyclohexane-1,2-dicarboxylate; and amide compounds, such as N,N,N'-tris[2-methylcyclohexyl]-1,2,3- propane tricarboxamide, N,N,N'-tricyclohexyl-1,3,5-benzene tricarboxamide, N,N-dicyclohexylnaphthalene dicarboxamide, and 1,3,5-tri(dimethylisopropoylamino)benzene. When a compound different from the aromatic phosphate metal salt represented by Formula (1) is incorporated, a total amount of the aromatic phosphate metal salt represented by Formula (1) and the compound different from the aromatic phosphate metal salt represented by Formula (1) is 0.001 to 5 parts by mass, preferably 0.005 to 5 parts by mass, more preferably 0.01 to 1 part by mass, with respect to 100 parts by mass of the olefin-based resin. In the total amount of the aromatic phosphate metal salt represented by Formula (1) and the compound different from the aromatic phosphate metal salt represented by Formula (1), the ratio of the aromatic phosphate metal salt represented by Formula (1) is preferably 50% by mass or higher, more preferably 60% by mass or higher, still more preferably 95% by mass or higher, particularly preferably 100% by mass.

As described above, the nucleating agent composition of the present invention contains an auxiliary agent, and the auxiliary agent is at least one selected from the group consisting of water and polyol compounds.

The water is, for example, tap water, industrial water, or purified water. Examples of the purified water include ion-exchanged water, ultrafiltrated water, reverse osmosis water, and distilled water.

The polyol compounds are compounds having two or more hydroxy groups. Specific examples of the polyol compounds include: glycols, such as 1,2-ethanediol, 1,3-propanediol, 1,2-propanediol, 1,4-butanediol, 1,3-butanediol, neopentyl glycol, diethylene glycol, triethylene glycol, polyethylene glycol, dipropylene glycol, tripropylene glycol, polypropylene glycol, cyclobutanediol, cyclopentanediol, cyclohexanediol, cycloheptanediol, cyclooctanediol, cyclohexane dimethanol, tricyclohexane dimethanol, tricyclodecane dimethanol, hydroxypropylcyclohexanol, tricyclo[5,2,1,0,2,6]decane-dimethanol, bicyclo[4,3,0]-nonanediol, dicyclohexanediol, tricyclo[5,3,1,1]dodecanediol, bicyclo[4,3,0]nonane dimethanol, tricyclo[5,3,1,1]dodecane-diethanol, hydroxypropyl tricyclo[5,3,1,1]dodecanol, spiro[3,4]octanediol, butylcyclohexanediol, 1,1'-bicyclohexylidenediol, 4,4'-isopropylidene-biscyclohexanol, 4,4'-oxybiscyclohexanol, and bis(4-hydroxycyclohexanol)methane; sugar alcohols, such as glycerol, erythritol, pentaerythritol, dipentaerythritol, sorbitol, xylitol, maltitol, lactitol, mannitol, and isomalt; mono-fatty acid esters composed of any of these sugar alcohols and a fatty acid such as myristic acid, palmitic acid, stearic acid, oleic acid, or 12-hydroxystearic acid; linear, branched or cyclic aliphatic polyols having three or more hydroxy groups, such as polyvinyl alcohols, polycaprolactonetriol, cyclohexanetriol, trimethylolethane, trimethylolpropane, and ditrimethylolpropane; aromatic polyols, such as cyclohexane diethanol dihydroxybenzene, benzenetriol, hydroxybenzyl alcohol, dihydroxytoluene, 4,4'-oxybisphenol, 4,4'-dihydroxybenzophenone, 4,4'-thiobisphenol, phenolphthalein, bis(4-hydroxyphenyl)methane, 4,4'-(1,2-ethenediyl)bisphenol, 4,4'-sulfonylbisphenol, 4,4'-isopropylidene-bis(2,6-dibromophenol), 4,4'-isopropylidene-bis(2,6-dichlorophenol), and 4,4'-isopropylidene-bis(2,3,5,6-tetrachlorophenol); and 4,4'-thiobiscyclohexanol.

Thereamong, glycols, sugar alcohols, mono-fatty acid esters composed of a sugar alcohol and a fatty acid, and polyvinyl alcohols are preferred from the standpoint of further improving the mechanical properties and transparency of a molded article; ethylene glycol, diethylene glycol, propylene glycol, dipropylene glycol, glycerol, erythritol, pentaerythritol, dipentaerythritol, xylitol, sorbitol, maltitol, lactitol, glycerol monostearate, glycerol monooleate, glycerol mono-12-hydroxystearate, and polyvinyl alcohols are more preferred; and ethylene glycol, glycerol, pentaerythritol, xylitol, glycerol monostearate, and polyvinyl alcohols are particularly preferred.

The auxiliary agent contained in the nucleating agent composition of the present invention may consist of only water or a polyol compound, or may consist of a mixture of water and a polyol compound.

From the standpoint of obtaining a molded article having excellent mechanical properties and transparency without greatly affecting the properties other than the mechanical properties and the transparency, the auxiliary agent contained in the nucleating agent composition of the present invention preferably consists of water.

Further, from the standpoint of imparting particularly excellent crystallinity to an olefin-based resin, the auxiliary agent contained in the nucleating agent composition of the present invention preferably consists of a polyol compound. When the auxiliary agent consists of a polyol compound, from the standpoint of inhibiting volatilization of the auxiliary agent during molding, the polyol compound is preferably solid or liquid at 230° C., more preferably solid or liquid at 250° C., still more preferably solid or liquid at 280° C.

In the nucleating agent composition of the present invention, the content of the auxiliary agent is 1 to 10,000 parts by mass with respect to 100 parts by mass of the nucleating agent. From the standpoint of imparting particularly excellent nucleating performance to an olefin-based resin, the content of the auxiliary agent is preferably 5 to 1,000 parts by mass, more preferably 10 to 500 parts by mass, with respect to 100 parts by mass of the nucleating agent.

In the nucleating agent composition of the present invention, other additive(s) that can be blended into an olefin-based resin may further be incorporated as long as the properties of a molded article are not greatly impaired. The nucleating agent composition of the present invention may also be a masterbatch that further contains an olefin-based resin.

Examples of the other additives include those that are generally used in olefin-based resins, such as a phenolic antioxidant, a phosphorus-based antioxidant, a sulfur-based antioxidant, an ultraviolet absorber, a hindered amine compound, a flame retardant, a flame retardant aid, a lubricant, a filler, a hydrotalcite, a fatty acid metal salt, an antistatic agent, a fluorescent brightener, a pigment, and a dye. In the nucleating agent composition of the present invention, the amount of the other additives to be incorporated may be any amount as long as it is in a range that does not impair the effects of the present invention and is appropriate for imparting desired performance to the resulting molded article when the nucleating agent composition of the present invention is blended and molded with an olefin-based resin.

Examples of the phenolic antioxidant include 2,6-di-tert-butyl-4-ethylphenol, 2-tert-butyl-4,6-dimethylphenol, styrenated phenol, 2,2'-methylene-bis(4-ethyl-6-tert-butylphenol), 2,2'-thiobis-(6-tert-butyl-4-methylphenol), 2,2'-thiodiethylene-bis[3-(3,5-di-tert-butyl-4-hydroxyphenyl) propionate], 2-methyl-4,6-bis(octylsulfanylmethyl)phenol, 2,2'-isobutylidene-bis(4,6-dimethylphenol), isooctyl-3-(3,5-di-tert-butyl-4-hydroxyphenyl)propionate, N,N-hexane-1,6-diylbis[3-(3,5-di-tert-butyl-4-hydroxyphenyl)propionamide], 2,2'-oxamide-bis[ethyl-3-(3,5-di-tert-butyl-4-hydroxyphenyl)propionate], 2-ethylhexyl-3-(3',5'-di-tert-butyl-4'-hydroxyphenyl)propionate, 2,2'-ethylene-bis(4,6- di-tert-butylphenol), esters of 3,5-di-tert-butyl-4-hydroxybenzene-propanoic acid and a C13-15 alkyl, 2,5-di-tert-amylhydroquinone, hindered phenol polymers (e.g., trade name "AO.OH.98" manufactured by ADEKA Polymer Additives Europe SAS), 2,2'-methylene-bis[6-(1-methylcyclohexyl)-p-cresol], 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 6-[3-(3-tert-butyl-4-hydroxy-5-methyl)propoxy]-2,4,8,10-tetra-tert-butylbenzo[d,f][1,3,2]-dioxaphosphepin, hexamethylene-bis[3-(3,5-di-tert-butyl-4-hydroxyphenyl) propionate, calcium bis[monoethyl(3,5-di-tert-butyl-4-hydroxybenzyl)phosphonate], a reaction product between 5,7-bis(1,1-dimethylethyl)-3-hydroxy-2(3H)-benzofuranone and o-xylene, 2,6-di-tert-butyl-4-(4,6-bis(octylthio)-1,3,5-triazine-2-ylamino)phenol, DL-a-tocopherol (vitamin E), 2,6-bis(α-methylbenzyl)-4-methylphenol, bis[3,3-bis-(4'-hydroxy-3'-tert-butyl-phenyl)butyric acid]glycol ester, 2,6-di-tert-butyl-p-cresol, 2,6-diphenyl-4-octadecyloxyphenol, stearyl(3,5-di-tert-butyl-4-hydroxyphenyl)propionate, distearyl(3,5-di-tert-butyl-4-hydroxybenzyl)phosphonate, tridecyl-3,5-tert-butyl-4-hydroxybenzyl thioacetate, thiodiethylene-bis[(3,5-di-tert-butyl-4-hydroxyphenyl)propionate], 4,4'-thiobis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene-bis(2,6-di-tert-butylphenol), 4,4'-butylidene-bis(6-tert-butyl-3-methylphenol), 2,2'-ethylidene-bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis[methylene-3-(3',5'-di-tert-butyl-4'-hydroxyphenyl) propionate]methane, 2-tert-butyl-4-methyl-6-(2-acryloyloxy-3-tert-butyl-5-methylbenzyl)phenol, 3,9-bis[2-(3-tert-butyl-4-hydroxy-5-methylhydrocinnamoyloxy)-1,1-dimethylethyl]-2,4,8,10-tetraoxaspiro[5.5]undecane, triethylene glycol-bis[β-(3-tert-butyl-4-hydroxy-5-methylphenyl)propionate], and 3-(3,5-dialkyl-4-hydroxyphenyl) propionic acid derivatives, such as stearyl-3-(3,5-di-tert-butyl-4-hydroxyphenyl)propionic acid amide, palmityl-3-(3,5-di-tert-butyl-4-hydroxyphenyl)propionic acid amide, myristyl-3-(3,5-di-tert-butyl-4-hydroxyphenyl)propionic acid amide, and lauryl-3-(3,5-di-tert-butyl-4-hydroxyphenyl)propionic acid amide. When a phenolic antioxidant is incorporated, the amount thereof is adjusted to be preferably 0.001 to 5 parts by mass, more preferably 0.03 to 3 parts by mass, with respect to 100 parts by mass of the olefin-based resin.

Examples of the phosphorus-based antioxidant include triphenyl phosphite, diisooctyl phosphite, heptakis(dipropylene glycol)triphosphite, triisodecyl phosphite, diphenylisooctyl phosphite, diisooctylphenyl phosphite, diphenyltridecyl phosphite, triisooctyl phosphite, trilauryl phosphite, diphenyl phosphite, tris(dipropylene glycol)phosphite, dioleyl hydrogen phosphite, trilauryl trithiophosphite, bis(tridecyl)phosphite, tris(isodecyl)phosphite, tris(tridecyl)phosphite, diphenyldecyl phosphite, dinonylphenyl-bis (nonylphenyl)phosphite, poly(dipropylene glycol)phenyl phosphite, tetraphenyldipropyl glycol diphosphite, trisnonylphenyl phosphite, tris(2,4-di-tert-butylphenyl)phosphite, tris(2,4-di-tert-butyl-5-methylphenyl)phosphite, tris[2-tert-butyl-4-(3-tert-butyl-4-hydroxy-5-methylphenylthio)-5-methylphenyl]phosphite, tri(decyl) phosphite, octyldiphenyl phosphite, di(decyl)monophenyl phosphite, mixtures of distearyl pentaerythritol and calcium stearate, alkyl(C10) bisphenol-A phosphite, tetraphenyl-tetra(tridecyl)pentaerythritol tetraphosphite, bis(2,4-di-tert-butyl-6-methylphenyl) ethyl phosphite, tetra(tridecyl)isopropylidene diphenol diphosphite, tetra(tridecyl)-4,4'-n-butylidene-bis(2-tert-butyl-5-methylphenol)diphosphite, hexa(tridecyl)-1,1,3-tris (2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, (1-methyl-1-propanyl-3-ylidene) tris(1,1-dimethylethyl)-5-methyl-4,1-phenylene)hexatridecyl phosphite, 2,2'-methylene-bis(4,6-tert-butylphenyl)-2-ethylhexyl phosphite, 2,2'-methylene-bis(4,6-di-tert-butylphenyl)-octadecyl phosphite, 2,2'-ethylidene-bis(4,6-di-tert-butylphenyl)fluorophosphite, 4,4'-butylidene-bis(3-methyl-6-tert-butylphenylditridecyl)phosphite, tris(2-[(2,4,8,10-tetrakis-tert-butyldibenzo[d,f][1,3,2]dioxaphosphepin-6-yl)oxy]ethyl)amine, 3,9-bis(4-nonylphenoxy)-2,4,8,10-tetraoxa-3,9-diphosphaspiro[5,5]undecane, 2,4,6-tri-tert-butylphenyl-2-butyl-2-ethyl-1,3-propanediol phosphite, poly-4,4'-isopropylidene diphenol C12-15 alcohol phosphite, bis(diisodecyl)pentaerythritol diphosphite, bis(tridecyl)pentaerythritol diphosphite, bis(octadecyl)pentaerythritol diphosphite, bis(nonylphenyl)pentaerythritol diphosphite, bis(2,4-di-tert-butylphenyl)pentaerythritol diphosphite, bis(2,4,6-tri-tert-butylphenyl)pentaerythritol diphosphite, bis(2,6-di-tert-butyl-4-methylphenyl)pentaerythritol diphosphite, and bis(2,4-dicumylphenyl)pentaerythritol diphosphite. When a phosphorus-based antioxidant is incorporated, the amount thereof is adjusted to be preferably 0.001 to 10 parts by mass, more preferably 0.01 to 0.5 parts by mass, with respect to 100 parts by mass of the olefin-based resin.

Examples of the sulfur-based antioxidant include tetrakis [methylene-3-(laurylthio)propionate]methane, bis(methyl-4-[3-n-alkyl(C12/C14)thiopropionyloxy]-5-tert-butylphenyl)sulfide, ditridecyl-3,3'-thiodipropionate, dilauryl-3,3'-thiodipropionate, dimyristyl-3,3'-thiodipropionate, distearyl-3,3'-thiodipropionate, lauryl/stearyl thiodipropionate, 4,4'-thiobis(6-tert-butyl-m-cresol), 2,2'-thiobis(6-tert-butyl-p-cresol), distearyl disulfide. When a sulfur-based antioxidant is incorporated, the amount thereof is adjusted to be preferably 0.001 to 10 parts by mass, more preferably 0.01 to 0.5 parts by mass, with respect to 100 parts by mass of the olefin-based resin.

Examples of the ultraviolet absorber include; 2-hydroxybenzophenones, such as 2,4-dihydroxybenzophenone and 5,5'-methylene-bis(2-hydroxy-4-methoxybenzophenone); 2-(2-hydroxyphenyl)benzotriazoles, such as 2-(2-hydroxy-5-methylphenyl)benzotriazole, 2-(2-hydroxy-5-tert-octylphenyl)benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolyl phenol), polyethylene glycol esters of 2-(2-hydroxy-3-tert-butyl-5-carboxyphenyl)benzotriazole, 2-[2-hydroxy-3-(2-acryloyloxyethyl)-5-methylphenyl]benzotriazole, 2-[2-hydroxy-3-(2-methacryloyloxyethyl)-5-tert-butylphenyl]benzotriazole, 2-[2-hydroxy-3-(2-methacryloyloxyethyl)-5-tert-octylphenyl]benzotriazole, 2-[2-hydroxy-3-(2-methacryloyloxyethyl)-5-tert-butylphenyl]-5-chlorobenzotriazole, 2-[2-hydroxy-5-(2-methacryloyloxyethyl)phenyl]benzotriazole, 2-[2-hydroxy-3-tert-butyl-5-(2-methacryloyloxyethyl)phenyl]

benzotriazole, 2-[2-hydroxy-3-tert-amyl-5-(2-methacryloyloxyethyl)phenyl]benzotriazole, 2-[2-hydroxy-3-tert-butyl-5-(3-methacryloyloxypropyl)phenyl]-5-chlorobenzotriazole, 2-[2-hydroxy-4-(2-methacryloyloxymethyl)phenyl] benzotriazole, 2-[2-hydroxy-4-(3-methacryloyloxy-2-hydroxypropyl)phenyl]benzotriazole, and 2-[2-hydroxy-4-(3-methacryloyloxypropyl)phenyl]benzotriazole; phenyl salicylate; resorcinol monobenzoate; substituted oxanilides, such as 2-ethyl-2'-ethoxyoxanilide and 2-ethoxy-4'-dodecyloxanilide; cyanoacrylates, such as ethyl-α-cyano-β,β-diphenyl acrylate and methyl-2-cyano-3-methyl-3-(p-methoxyphenyl)acrylate; triazines, such as 2-(4,6-diphenyl-1,3,5-triazine-2-yl)-5-hexyloxyphenol, 2-(2-hydroxy-4-octoxyphenyl)-4,6-bis(2,4-dimethylphenyl)-1,3,5-triazine, trioctyl-2,2',2"-((1,3,5-triazine-2,4,6-triyl)tris(3-hydroxybenzene-4-,1-diyl)tripropionate), 2-(4,6-diphenyl-1,3,5-triazine-2-yl)-5-[2-(2-ethylhexanoyloxy)ethoxy]phenol, 2,4,6-tris(2-hydroxy-4-hexyloxy-3-methylphenyl)-1,3,5-triazine, and 1,12-bis[2-[4-(4,6-diphenyl-1,3,5-triazine-2-yl)-3-hydroxyphenoxy]ethyl]dodecane dioate; and a variety of metal salts and metal chelates, particularly salts and chelates of nickel and chromium. When an ultraviolet absorber is incorporated, the amount thereof is adjusted to be preferably 0.001 to 10 parts by mass, more preferably 0.01 to 0.5 parts by mass, with respect to 100 parts by mass of the olefin-based resin.

Examples of the hindered amine compound include 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, bis(2,2,6,6-tetramethyl-4-piperidyl)-di(tridecyl)-1,2,3,4-butanetetracarboxylate, bis(1,2,2,6,6-pentamethyl-4-piperidyl)-di(tridecyl)-1,2,3,4-butanetetracarboxylate, bis(1,2,2,4,4-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazine-6-yl]-1,5,8,12-tetraazadodecane, 1,5,8,12-tetrakis[2,4-bis(N-butyl-N-(1,2,2,6,6-pentamethyl-4-piperidyl)amino)-s-triazine-6-yl]-1,5,8,12-tetraazadodecane, 1,6,11-tris[2,4-bis(N-butyl-N-(2,2,6,6-tetramethyl-4-piperidyl)amino)-s-triazine-6-yl] aminoundecane, 1,6,11-tris[2,4-bis(N-butyl-N-(1,2,2,6,6-pentamethyl-4-piperidyl)amino)-s-triazine-6-yl] aminoundecane, bis{4-(1-octyloxy-2,2,6,6-tetramethyl) piperidyl}decanedionate, and bis{4-(2,2,6,6-tetramethyl-1-undecyloxy)piperidyl)carbonate. When a hindered amine compound is incorporated, the amount thereof is adjusted to be preferably 0.001 to 10 parts by mass, more preferably 0.01 to 0.5 parts by mass, with respect to 100 parts by mass of the olefin-based resin.

Examples of the flame retardant include: aromatic phosphates, such as triphenyl phosphate, tricresyl phosphate, trixylenyl phosphate, cresyldiphenyl phosphate, cresyl-2,6-dixylenyl phosphate, resorcinol-bis(diphenylphosphate), (1-methylethylidene)-4,1-phenylene tetraphenyldiphosphate, and 1,3-phenylene-tetrakis(2,6-dimethylphenyl)phosphate, as well as "ADK STAB FP-500", "ADK STAB FP-600" and "ADK STAB FP-800" (trade names, manufactured by ADEKA Corporation); phosphonates, such as divinyl phenylphosphonate, diallyl phenylphosphonate, and (1-butenyl) phenylphosphonate; phosphinates, such as phenyl diphenylphosphinate, methyl diphenylphosphinate, and 9,10-dihydro-9-oxa-10-phosphaphenanthlene-10-oxide derivatives; phosphazene compounds, such as bis(2-allylphenoxy)phosphazene and dicresyl phosphazene; phosphorus-based flame retardants, such as melamine phosphate, melamine pyrophosphate, melamine polyphosphate, melam polyphosphate, ammonium polyphosphate, piperazine phosphate, piperazine pyrophosphate, piperazine polyphosphate, phosphorus-containing vinylbenzyl compounds, and red phosphorus; metal hydroxides, such as magnesium hydroxide and aluminum hydroxide; and bromine-based flame retardants, such as brominated bisphenol A-type epoxy resins, brominated phenol novolac-type epoxy resins, hexabromobenzene, pentabromotoluene, ethylene-bis(pentabromophenyl), ethylene-bis-tetrabromophthalimide, 1,2-dibromo-4-(1,2-dibromoethyl)cyclohexane, tetrabromocyclooctane, hexabromocyclododecane, bis(tribromophenoxy)ethane, brominated polyphenylene ether, brominated polystyrene, 2,4,6-tris(tribromophenoxy)-1,3,5-triazine, tribromophenyl maleimide, tribromophenyl acrylate, tribromophenyl methacrylate, tetrabromobisphenol A-type dimethacrylate, pentabromobenzyl acrylate, and brominated styrene. These flame retardants are preferably used in combination with a drip inhibitor such as a fluorocarbon resin, and/or a flame retardant aid such as a polyhydric alcohol or hydrotalcite. When a flame retardant is incorporated, the amount thereof is adjusted to be preferably 1 to 100 parts by mass, more preferably 10 to 70 parts by mass, with respect to 100 parts by mass of the olefin-based resin.

A lubricant is added for the purposes of imparting the surface of the resulting molded article with lubricity and improving the damage-preventing effect. Examples of the lubricant include: unsaturated fatty acid amides, such as oleic acid amide and erucic acid amide; saturated fatty acid amides, such as behenic acid amide and stearic acid amide; butyl stearate; stearyl alcohol; stearic acid monoglyceride; sorbitan monopalmitate; sorbitan monostearate; mannitol; stearic acid; hardened castor oil; stearic acid amide; oleic acid amide; and ethylene-bis stearic acid amide. These lubricants may be used individually, or two or more thereof may be used in combination. When a lubricant is incorporated, the amount thereof is adjusted to be preferably 0.01 to 2 parts by mass, more preferably 0.03 to 1 part by mass, with respect to 100 parts by mass of the olefin-based resin.

Fillers are broadly classified into organic fillers and inorganic fillers. Examples of the organic fillers include: naturally-occurring polymers, such as starch, cellulose, wood powder, bean curd refuse, rice husk, and bran; and modified products thereof. Examples of the inorganic fillers include talc, calcium carbonate, zinc carbonate, wollastonite, silica, mica, alumina, magnesium oxide, calcium silicate, sodium aluminate, calcium aluminate, sodium aluminosilicate, magnesium silicate, glass balloon, carbon black, zinc oxide, antimony trioxide, zeolite, metal fibers, metal whiskers, ceramic whiskers, potassium titanate, boron nitride, graphites, glass fibers, and carbon fibers. When a filler is incorporated, the amount thereof is adjusted to be preferably 0.1 to 500 parts by mass, more preferably 1 to 100 parts by mass, with respect to 100 parts by mass of the olefin-based resin.

The above-described hydrotalcite is a complex salt compound which is known as a natural or synthetic product and composed of magnesium, aluminum, hydroxy groups, a carbonate group and arbitrary crystal water, and examples thereof include hydrotalcites in which some of the magnesium or aluminum atoms are substituted with other metal such as an alkali metal or zinc; and hydrotalcites in which the hydroxy group(s) and/or carbonate group is/are substituted with other anionic group(s), specifically hydrotalcites represented by the following Formula (2) in which a metal is substituted with an alkali metal. In addition, as an Al—Li hydrotalcite, a compound represented by the following Formula (3) can be used as well.

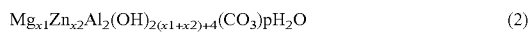

$$Mg_{x1}Zn_{x2}Al_2(OH)_{2(x1+x2)+4}(CO_3)pH_2O \quad (2)$$

wherein, x1 and x2 each represent a number that satisfies the conditions represented by the following equations, and p represents 0 or a positive number: $0 \leq x2/x1 < 10$, $2 \leq (x1+x2) \leq 20$.

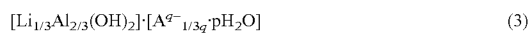

$$[Li_{1/3}Al_{2/3}(OH)_2]\cdot[A^{q-}{}_{1/3q}\cdot pH_2O] \quad (3)$$

wherein, $A^{q-}$ represents a q-valent anion, and p represents 0 or a positive number.

Further, the carbonate anions in these hydrotalcites may be partially substituted with other anions.

In these hydrotalcites, the crystal water may be dehydrated, and the hydrotalcites may be coated with, for example, a higher fatty acid such as stearic acid, a higher fatty acid metal salt such as alkali metal oleate, a metal organic sulfonate such as alkali metal dodecylbenzenesulfonate, a higher fatty acid amide, a higher fatty acid ester, or a wax.

The hydrotalcites may be naturally-occurring or synthetic hydrotalcites. Examples of a synthesis method thereof include known methods that are described in JPS46-2280B1, JPS50-30039B1, JPS51-29129B1, JPH03-36839B2, JPS61-174270A, JPH05-179052A, and the like. Further, the above-exemplified hydrotalcites can be used without any restriction in terms of their crystal structures, crystal particles and the like. When a hydrotalcite is incorporated, the amount thereof is adjusted to be preferably 0.001 to 5 parts by mass, more preferably 0.01 to 3 parts by mass, with respect to 100 parts by mass of the olefin-based resin.

From the standpoint of obtaining heat resistance and a dispersion effect of the nucleating agent in a resin, the fatty acid metal salt is preferably a compound represented by the following Formula (4).

(4)

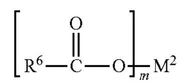

In Formula (4), $R^6$ represents a linear or branched fatty acid having 12 to 20 carbon atoms, and this fatty acid is optionally substituted with a hydroxy group. $M^2$ represents a monovalent to trivalent metal atom optionally having hydroxy, and m represents an integer of 1 to 3.

The fatty acid metal salt is preferably a metal salt of lauric acid, myristic acid, palmitic acid, stearic acid, or 12-hydroxystearic acid. Examples of the metal of the fatty acid metal salt include sodium, potassium, lithium, calcium, zinc, barium, magnesium and hydroxyaluminum, and the metal is preferably sodium, lithium, or potassium.

Examples of the above-described antistatic agent include low-molecular-weight antistatic agents based on nonionic, anionic, cationic or amphoteric surfactants, and high-molecular-weight antistatic agents based on polymer compounds. Examples of the nonionic surfactants include: polyethylene glycol-type nonionic surfactants, such as higher alcohol ethylene oxide adducts, fatty acid ethylene oxide adducts, higher alkylamine ethylene oxide adducts, and polypropylene glycol ethylene oxide adducts; and polyhydric alcohol-type nonionic surfactants, such as polyethylene oxides, glycerin fatty acid esters, pentaerythritol fatty acid esters, sorbitol or sorbitan fatty acid esters, polyhydric alcohol alkyl ethers, and alkanolamine aliphatic amides. Examples of the anionic surfactants include: carboxylates, such as alkali metal salts of higher fatty acids; sulfates, such as higher alcohol sulfates and higher alkyl ether sulfates; sulfonates, such as alkylbenzene sulfonates, alkyl sulfonates, and paraffin sulfonates; and phosphates, such as higher alcohol phosphates, and examples of the cationic surfactants include quaternary ammonium salts, such as alkyltrimethyl ammonium salts. Examples of the amphoteric surfactants include: amino acid-type amphoteric surfactants, such as higher alkyl aminopropionates; and betaine-type amphoteric surfactants, such as higher alkyl dimethylbetaines and higher alkyl dihydroxyethylbetaines. Among these surfactants, an anionic surfactant is preferred, and a sulfonate such as an alkylbenzene sulfonate, an alkylsulfonate, or a paraffin sulfonate is particularly preferred. When a low-molecular-weight antistatic agent is incorporated, the amount thereof is adjusted to be preferably 0.1 to 10 parts by mass, more preferably 0.5 to 5 parts by mass, with respect to 100 parts by mass of the olefin-based resin.

Examples of the high-molecular-weight antistatic agents include ionomers, and block polymers containing a polyethylene glycol as a hydrophilic moiety. Examples of the ionomers include the ionomer disclosed in JP2010-132927A. Examples of the polymers containing a polyethylene glycol as a hydrophilic moiety include the polyether ester amide disclosed in JPH07-10989A, the polymer disclosed in U.S. Pat. No. 6,552,131B1 which is composed of a polyolefin and a polyethylene glycol, and the polymer disclosed in JP2016-023254A which is composed of a polyester and a polyethylene glycol. When a high-molecular-weight antistatic agent is incorporated, the amount thereof is adjusted to be preferably 3 to 60 parts by mass, more preferably 5 to 25 parts by mass, still more preferably 7 to 20 parts by mass, with respect to 100 parts by mass of the olefin-based resin.

The fluorescent brightener is a compound which enhances the whiteness or blueness of a molded article by a fluorescent action of absorbing ultraviolet rays of solar light and artificial light, converting the absorbed ultraviolet rays into visible light of purple to blue, and radiating the visible light. Examples of the fluorescent brightener include C.I. Fluorescent Brightener 184, which is a benzoxazole-based compound; C.I. Fluorescent Brightener 52, which is a coumarin-based compound; and C.I. Fluorescent Brighteners 24, 85 and 71, which are diaminostilbene disulfonic acid-based compounds. When a fluorescent brightener is used, the amount thereof is adjusted to be preferably 0.00001 to 0.1 parts by mass, more preferably 0.00005 to 0.05 parts by mass, with respect to 100 parts by mass of the olefin-based resin.

As the above-described pigment, a commercially available pigment can be used, and examples thereof include PIGMENT RED 1, 2, 3, 9, 10, 17, 22, 23, 31, 38, 41, 48, 49, 88, 90, 97, 112, 119, 122, 123, 144, 149, 166, 168, 169, 170, 171, 177, 179, 180, 184, 185, 192, 200, 202, 209, 215, 216, 217, 220, 223, 224, 226, 227, 228, 240, and 254; PIGMENT ORANGE 13, 31, 34, 36, 38, 43, 46, 48, 49, 51, 52, 55, 59, 60, 61, 62, 64, 65, and 71; PIGMENT YELLOW 1, 3, 12, 13, 14, 16, 17, 20, 24, 55, 60, 73, 81, 83, 86, 93, 95, 97, 98, 100, 109, 110, 113, 114, 117, 120, 125, 126, 127, 129, 137, 138, 139, 147, 148, 150, 151, 152, 153, 154, 166, 168, 175, 180, and 185; PIGMENT GREEN 7, 10, and 36; PIGMENT BLUE 15, 15:1, 15:2, 15:3, 15:4, 15:5, 15:6, 22, 24, 29, 56, 60, 61, 62, and 64; and PIGMENT VIOLET 1, 15, 19, 23, 27, 29, 30, 32, 37, 40, and 50.

Examples of the above-described dye include azo dyes, anthraquinone dyes, indigoid dyes, triarylmethane dyes, xanthene dyes, alizarin dyes, acridine dyes, stilbene dyes, thiazole dyes, naphthol dyes, quinoline dyes, nitro dyes, indamine dyes, oxazine dyes, phthalocyanine dyes and cyanine dyes, and a plurality of these dyes may be mixed and used in combination.

Next, the olefin-based resin composition of the present invention will be described. The olefin-based resin composition of the present invention contains an olefin-based resin, a nucleating agent, and an auxiliary agent. The nucleating agent contains an aromatic phosphate metal salt represented by the following Formula (1), and the auxiliary agent is at least one selected from the group consisting of water and polyol compounds.

(1)

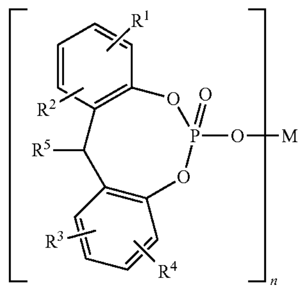

In Formula (1), $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum. The olefin-based resin composition of the present invention contains 0.001 to 5 parts by mass of the nucleating agent and 0.003 to 10 parts by mass of the auxiliary agent with respect to 100 parts by mass of the olefin-based resin.

The olefin-based resin composition of the present invention has excellent crystallinity. Further, the olefin-based resin composition of the present invention can yield a molded article having excellent mechanical properties and transparency.

Examples of the olefin-based resin that can be used in the resin composition of the present invention include: α-olefin polymers, such as low-density polyethylenes (LDPE), linear low-density polyethylenes (L-LDPE), high-density polyethylenes (HDPE), isotactic polypropylenes, syndiotactic polypropylenes, hemi-isotactic polypropylenes, cycloolefin polymers, stereo block polypropylenes, poly-3-methyl-1-butenes, poly-3-methyl-1-pentenes, and poly-4-methyl-1-pentenes; and α-olefin copolymers, such as homopolypropylenes, ethylene-propylene block or random copolymers, impact copolymer polypropylenes, ethylene-methyl methacrylate copolymers, ethylene-methyl acrylate copolymers, ethylene-ethyl acrylate copolymers, ethylene-butyl acrylate copolymers, ethylene-vinyl acetate copolymers, and ethylene-vinyl alcohol resins (EVOH), and an elastomer composed of the olefin-based resin may be used as well. In the resin composition of the present invention, two or more of such olefin-based resins may be blended, may form a block copolymer to be used as a block polymer-type resin, or may be alloyed. Further, the olefin-based resin may be a chlorination product of any of the above-described olefin-based resins.

Examples of the elastomer composed of the olefin-based resin include elastomers obtained by blending a polyolefin (e.g., polypropylene or polyethylene) as a hard segment and a rubber (e.g., ethylene-propylene rubber) as a soft segment, and elastomers obtained by dynamic cross-linking of these segments. The hard segment is, for example, at least one selected from polypropylene homopolymers, polypropylene block copolymers, polypropylene random copolymers and the like. The soft segment is, for example, an ethylene-propylene copolymer (EPM), an ethylene-propylene-diene copolymer (EPDM), an ethylene-vinyl acetate copolymer (EVA), or a vinyl acetate homopolymer. In the olefin-based resin composition of the present invention, two or more of these polymers may be used as a blend.

In the resin composition of the present invention, the olefin-based resin is particularly preferably a polypropylene-based resin, such as a polypropylene, an ethylene-propylene block or random copolymer, a block or random copolymer composed of an α-olefin other than ethylene and propylene, or a mixture of any of these propylene-based polymers and other α-olefin polymer, since it allows the effects of the present invention to be exerted prominently.

As for a method of producing the olefin-based resin, the olefin-based resin can be produced by appropriately selecting the polymerization conditions (e.g., temperature, pressure, concentration, flow rate, and removal of catalyst residue) in a variety of polymerization methods such as vapor-phase polymerization, solution polymerization, emulsion polymerization and bulk polymerization that include the use of various polymerization catalysts (e.g., Ziegler catalysts, Ziegler-Natta catalysts, and metallocene catalysts), co-catalysts, catalyst carriers, and chain transfer agents. Other properties of the olefin-based resin, such as number-average molecular weight, weight-average molecular weight, molecular weight distribution, melt flow rate, melting point, melting peak temperature, stereoregularity (e.g., isotacticity or syndiotacticity), presence/absence and degree of branching, specific gravity, ratio of a component(s) dissolving in various solvents, haze, gloss, impact strength, flexural modulus and Olsen rigidity, as well as whether or not the respective property values satisfy a specific formula, can be selected as appropriate in accordance with the desired properties.

In the olefin-based resin composition of the present invention, the nucleating agent and the auxiliary agent may be the same as those contained in the nucleating agent composition of the present invention.

As described above, in the resin composition of the present invention, the content of the nucleating agent is 0.001 to 5 parts by mass with respect to 100 parts by mass of the olefin-based resin. From the standpoint of obtaining a sufficient addition effect of the nucleating agent and inhibiting the generation of aggregates of the nucleating agent as foreign matters in a molded article, the content of the nucleating agent is preferably 0.005 to 5 parts by mass, more preferably 0.01 to 1 part by mass, with respect to 100 parts by mass of the olefin-based resin.

Further, as described above, in the resin composition of the present invention, the content of the auxiliary agent is 0.003 to 10 parts by mass with respect to 100 parts by mass of the olefin-based resin. When the content of the auxiliary agent is less than 0.003 parts by mass, the effects of the present invention may not be obtained, whereas when the content of the auxiliary agent is greater than 10 parts by mass, the feeding property of the composition is deteriorated, and this may cause deterioration of the external appearance of a molded article due to, for example, bridging inside a hopper or a feeder of a processing machine such as an extruder, foaming during an extrusion process of the composition, or generation of air bubbles in the molded article. From the standpoint of sufficiently obtaining the effects of the present invention and adequately inhibiting such deterioration of the feeding property of the composition, the content of the auxiliary agent is preferably 0.01 to 5 parts by mass, more preferably 0.04 to 1 part by mass, with respect to 100 parts by mass of the olefin-based resin. Further, the content of the auxiliary agent is preferably 1 to 10,000 parts by mass, more preferably 5 to 1,000 parts by mass, still more preferably 10 to 500 parts by mass, with respect to 100 parts by mass of the nucleating agent.

Meanwhile, from the standpoint of adequately inhibiting the occurrence of foaming during molding without excessively increasing the labor required for drying and making the process uneconomical, the resin composition of the present invention has a water content in a range of preferably 0.003 to 0.05% by mass, more preferably 0.005 to 0.03% by mass. The term "water content" used herein means a moisture content calculated from the amount of water measured using a polymer moisture meter "AQUATRAC 3E" manufactured by ITS Japan Inc.

In the resin composition of the present invention, other additive(s) that can be blended into an olefin-based resin may further be incorporated as long as the properties of a molded article are not greatly impaired. As the other additives, the same ones as those used in the nucleating agent composition of the present invention can be used. The amount of the other additives to be incorporated may be any amount as long as it is in a range that does not impair the effects of the present invention and is appropriate for imparting desired performance to the resulting molded article when the resin composition of the present invention is molded.

Next, the method of producing an olefin-based resin composition according to the present invention will be described. The method of producing an olefin-based resin composition according to the present invention includes: the preparation step of preparing an olefin-based resin not containing a nucleating agent component; and the blending step of blending a nucleating agent and an auxiliary agent into the thus prepared olefin-based resin not containing a nucleating agent component to obtain an olefin-based resin blend, and the nucleating agent contains an aromatic phosphate metal salt represented by the below-described Formula (1). The auxiliary agent is at least one selected from the group consisting of water and polyol compounds. In the blending step, the amount of the nucleating agent to be blended is 0.001 to 5 parts by mass with respect to 100 parts by mass of the olefin-based resin not containing a nucleating agent component, and the amount of the auxiliary agent to be blended is 0.003 to 10 parts by mass with respect to 100 parts by mass of the olefin-based resin not containing a nucleating agent component.

(1)

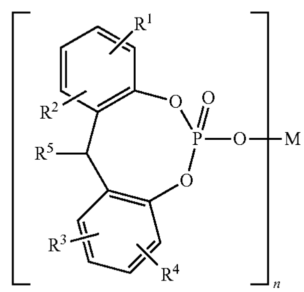

In Formula (1), $R^1$ to $R^4$ each represent an alkyl group having 1 to 6 carbon atoms; $R^5$ represents a hydrogen atom or an alkyl group having 1 to 3 carbon atoms; n represents 1 or 2; when n is 1, M represents lithium or dihydroxyaluminum; and when n is 2, M represents hydroxyaluminum.

By the method of producing an olefin-based resin composition according to the present invention, an olefin-based resin composition which imparts excellent transparency and mechanical properties to a molded article can be produced.

In the preparation step, an olefin-based resin not containing a nucleating agent component is prepared. In the olefin-based resin not containing a nucleating agent component, the above-described other additive(s) that can be blended into an olefin-based resin may be incorporated as well.

In the blending step, an olefin-based resin blend is obtained by blending a nucleating agent and an auxiliary agent into the olefin-based resin not containing a nucleating agent component, which has been prepared in the preparation step.

As described above, the amount of the nucleating agent to be blended is 0.001 to 5 parts by mass with respect to 100 parts by mass of the olefin-based resin not containing a nucleating agent component. From the standpoint of obtaining a sufficient addition effect of the nucleating agent and inhibiting the generation of aggregates of the nucleating agent as foreign matters in a molded article, the amount of the nucleating agent to be blended is preferably 0.005 to 5 parts by mass, more preferably 0.01 to 1 part by mass, with respect to 100 parts by mass of the olefin-based resin not containing a nucleating agent component.

Further, as described above, the amount of the auxiliary agent to be blended is 0.003 to 10 parts by mass with respect to 100 parts by mass of the olefin-based resin not containing a nucleating agent component. When the amount of the auxiliary agent is less than 0.003 parts by mass, the effects of the present invention may not be obtained, whereas when the amount of the auxiliary agent is greater than 10 parts by mass, the feeding property of the composition is deteriorated, and this may cause deterioration of the external appearance of a molded article due to, for example, bridging inside a hopper or a feeder of a processing machine such as an extruder, foaming during an extrusion process of the composition, or generation of air bubbles in the molded article. From the standpoint of sufficiently obtaining the effects of the present invention and adequately inhibiting such deterioration of the feeding property of the composition, the amount of the auxiliary agent to be blended is preferably 0.01 to 5 parts by mass, more preferably 0.04 to 1 part by mass, with respect to 100 parts by mass of the olefin-based resin not containing a nucleating agent component. Further, the amount of the auxiliary agent to be blended is preferably 1 to 10,000 parts by mass, more preferably 5 to 1,000 parts by mass, still more preferably 10 to 500 parts by mass, with respect to 100 parts by mass of the nucleating agent.

In the blending step, the above-described other additive(s) that can be incorporated into an olefin-based resin may further be blended. A method of blending the components in the blending step is not particularly restricted and, for example, a blending method using a Henschel mixer or a tumbler may be employed.

When water is blended as the auxiliary agent in the blending step, the water may be blended as, for example, a hydrate, a hydroxide, or a complex on which water is coordinated. Examples of the hydrate include compounds having crystal water, substances containing water in a molecular form, and clathrate compounds. Further, examples of the hydroxide include metal hydroxides, such as calcium hydroxide, magnesium hydroxide, aluminum hydroxide, and boehmite-type aluminum hydroxide. Alternatively, the water may be blended as a water-containing resin composition obtained by blending an olefin-based resin and water.

In the above-described manner, the olefin-based resin composition of the present invention is obtained as an olefin-based resin blend.

The method of producing an olefin-based resin composition according to the present invention preferably further includes the melt-kneading step of melt-kneading the olefin-based resin blend obtained in the blending step. In this case, an olefin-based resin composition in which the nucleating agent and the auxiliary agent are uniformly dispersed in the olefin-based resin can be obtained. Further, when water is blended as the auxiliary agent, the water content in the composition can be reduced by volatilization of excess water during the melt-kneading, so that foaming during an extrusion process of the composition can be adequately inhibited. A melt-kneading method is not particularly restricted and, for example, a method using an extruder such as a uniaxial extruder or a biaxial extruder may be employed. The melt-kneading temperature is also not particularly restricted and may be, for example, 180 to 300° C. Moreover, in the melt-kneading step, the above-described other additive(s) that can be blended into an olefin-based resin may be incorporated using, for example, a side feeder.

In the above-described manner, the olefin-based resin composition of the present invention is obtained as a melt-kneaded body of an olefin-based resin blend. The thus obtained melt-kneaded body of an olefin-based resin blend may be granulated into a pellet form by a method such as strand cutting using, for example, a pelletizer.

Next, the molded article of the present invention will be described. The molded article of the present invention is obtained by molding the olefin-based resin composition of the present invention. A method of molding the resin composition of the present invention is not particularly restricted, and any known molding method can be employed. The molded article can be obtained by, for example, injection molding, extrusion molding, blow molding, rotational molding, vacuum molding, inflation molding, calender molding, slush molding, dip molding, or foam molding. Among these molding methods, injection molding, extrusion molding, and blow molding are preferred.

Examples of the molded article of the present invention include injection-molded articles, fibers, flat yarns, biaxially stretched films, uniaxially stretched films, unstretched films, sheets, thermoformed articles, extrusion blow-molded articles, injection blow-molded articles, injection stretch blow-molded articles, profile extrusion-molded articles, and rotationally molded articles. Thereamong, the molded article of the present invention is preferably an injection-molded article, a film, a sheet, or a thermoformed article.

The molded article of the present invention can be used in various applications, such as building materials, agricultural materials, components for vehicles (e.g., automobiles, trains, ships, and airplanes), packaging materials, miscellaneous goods, toys, home electric appliances, and medical supplies. Specific examples of these applications include: automotive components, such as bumpers, dashboards, instrument panels, battery casings, luggage cases, door panels, door trims, and fender liners; resin components for home electric appliances, such as refrigerators, laundry machines, and vacuum cleaners; household articles, such as tableware, buckets, and bath goods; resin components for connection, such as connectors; miscellaneous goods, such as toys, storage containers, and synthetic paper; medical molded articles, such as medical packages, syringes, catheters, medical tubes, syringe preparations, infusion solution bags, reagent containers, medicine containers, and medicine individual packagings; building materials, such as wall materials, flooring materials, window frames, wall papers, windows; wire coating materials; agricultural materials, such as greenhouses, tunnels, and flat yarn mesh bags; industrial materials, such as pallets, pail cans, backgrind tapes, tapes for liquid crystal protection, pipes, and modified silicone polymers for sealing materials; food packaging materials, such as wraps, trays, cups, films, bottles, caps, and storage containers; 3D printer materials; battery separator membranes; and fibers of clothes, woven fabrics, nonwoven fabrics and the like. The molded article of the present invention can also be used in those applications where various post-treatments are performed, for example, applications where sterilization by radiation is performed, such as medical applications and food packaging applications, as well as applications where a low-temperature plasma treatment and the like are performed after molding so as to improve the surface properties such as coating properties. The molded article of the present invention is particularly preferably used in automotive components, household articles, and food packaging materials.

EXAMPLES

The present invention will now be described more concretely by way of Examples thereof, however, the present invention is not restricted to the following Examples and the like by any means. The evaluations in Examples were performed in accordance with the below-described procedures.

<Crystallization Temperature Tc (° C.)>

The crystallization temperature (° C.) of a pellet was measured using a differential scanning calorimeter (DIAMOND DSC, manufactured by PerkinElmer Co., Ltd.). As for the measurement method, in a chart obtained by heating the pellet from room temperature to 230° C. at a rate of 50° C./min, maintaining the pellet for 15 minutes and then cooling the pellet to 50° C. at a rate of −10° C./min, the temperature at which endothermic reaction during the cooling process formed a peak top was defined as the crystallization temperature (° C.).

<Flexural Modulus (MPa)>

A pellet obtained by granulation was injection-molded using an injection molding machine (EC100-2A, manufactured by Toshiba Machine Co., Ltd.) at a mold temperature of 50° C. and a resin temperature of 200° C. to prepare a test piece having dimensions of 80 mm×10 mm×4 mm and, after leaving the thus obtained test piece to stand for at least 48 hours in an incubator at 23° C., the flexural modulus (MPa) was measured in accordance with ISO178 using a bending tester "AG-IS" manufactured by Shimadzu Corporation.

<Izod Impact Strength (kJ/$m^2$)>

A pellet obtained by granulation was injection-molded using an injection molding machine (EC100-2A, manufactured by Toshiba Machine Co., Ltd.) at a mold temperature of 50° C. and a resin temperature of 200° C. to prepare a test piece (notched) having dimensions of 80 mm×10 mm×4 mm and, after leaving the thus obtained test piece to stand for at least 48 hours in an incubator at 23° C., the Izod impact strength (kJ/$m^2$) was measured in accordance with ISO180.

<Half Crystallization Time $T_{1/2}$ (sec)>

The half crystallization time ($T_{1/2}$) of a pellet obtained by granulation was measured using a differential scanning calorimeter (DIAMOND DSC, manufactured by PerkinElmer Co., Ltd.). As for the measurement method, the pellet was heated from room temperature to 230° C. at a rate of 50° C./min, maintained for 15 minutes, and then cooled to 135° C. at a rate of −200° C./min. The temperature was maintained after reaching 135° C., and the time from the point when the temperature reached 135° C. to the point when the exothermic enthalpy required for crystallization was reduced to a half was determined and defined as the half crystallization time (sec).

<Haze (%)>

A pellet obtained by granulation was injection-molded using an injection molding machine (EC100-2A, manufactured by Toshiba Machine Co., Ltd.) at a mold temperature of 50° C. and a resin temperature of 200° C. to prepare a test piece having dimensions of 60 mm×60 mm×2 mm. This test piece was molded and immediately thereafter left to stand for at least 48 hours in an incubator at 23° C., after which the haze (%) was measured using Haze Guard i (manufactured by BYK Additives & Instruments, Ltd.) in accordance with ISO14782.

<Feeding Property>

An olefin-based resin composition, which was obtained by blending an olefin-based resin, a nucleating agent, water or a polyol compound, a phenolic antioxidant, a phosphorus-based antioxidant and calcium stearate using a Henschel mixer, was weighed in an amount of 20 g and loaded to a feeder of a powder property analyzer (MULTI TESTER MT-02, manufactured by Seishin Enterprise Co., Ltd.), and the time until discharge of an olefin-based resin composition was measured. The feeding property was evaluated as "good" when the time until discharge of an olefin-based resin composition was 3.2 seconds or shorter, while the feeding property was evaluated as "poor" when the time until discharge of an olefin-based resin composition was longer than 3.2 seconds.

Examples 1-1 to 1-14, Comparative Examples 1-1 to 1-3

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, 0.1 parts by mass of the nucleating agent shown in Table 1, and water or a polyol compound in the amount shown in Table 1 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. It is noted here that the nucleating agent, water, and a polyol compound were not incorporated in Comparative Example 1-1, and water and a polyol compound were not incorporated in Comparative Example 1-2. The thus obtained pellet had a water content of about 0.008% by mass in all cases. The pellet was dried at 60° C. for 8 hours and then used for evaluating the crystallization temperature (° C.) and the flexural modulus (MPa). The dried pellet had a water content of about 0.0055% by mass.

TABLE 1

| | Nucleating agent | Water Polyol compound [parts by mass] | Crystallization temperature [° C.] | Flexural modulus [MPa] | Feeding property |
|---|---|---|---|---|---|
| Example 1-1 | Compound 1 | water 0.04 | 130.1 | 1,900 | good |
| Example 1-2 | Compound 1 | water 0.06 | 130.4 | 1,900 | good |
| Example 1-3 | Compound 1 | water 0.08 | 130.5 | 1.920 | good |
| Example 1-4 | Compound 1 | water 0.10 | 130.9 | 1.930 | good |
| Example 1-5 | Compound 1 | water 0.15 | 131.4 | 1.980 | good |
| Example 1-6 | Compound 1 | water 0.25 | 131.6 | 1,980 | good |
| Example 1-7 | Compound 1 | water 0.30 | 131.5 | 1,980 | good |
| Example 1-8 | Compound 1 | water 10 | 131.7 | 1,980 | good |
| Example 1-9 | Compound 1 | ethylene glycol 0.04 | 131.0 | 1,980 | good |
| Example 1-10 | Compound 1 | glycerol 0.04 | 130.5 | 1,970 | good |

TABLE 1-continued

| | Nucleating agent | Water Polyol compound [parts by mass] | Crystal-lization temperature [° C.] | Flexural modulus [MPa] | Feeding property |
|---|---|---|---|---|---|
| Example 1-11 | Compound 1 | penta-erythritol 0.3 | 130.9 | 2,070 | good |
| Example 1-12 | Compound 1 | xylitol 0.3 | 131.1 | 2,060 | good |
| Example 1-13 | Compound 1 | polyvinyl alcohol 0.3 | 130.6 | 1,970 | good |
| Example 1-14 | Compound 1 | glycerol monostearate 0.3 | 130.6 | 1,960 | good |
| Comparative Example 1-1 | — | — | 115.6 | 1,400 | good |
| Comparative Example 1-2 | Compound 1 | — | 129.5 | 1,880 | good |
| Comparative Example 1-3 | Compound 1 | water 13 | 131.3 | 1,980 | poor |

Compound 1: lithium-2,2'-methylene-bis(4,6-di-tert-butylphenyl)phosphate

Examples 2-1 to 2-6, Comparative Examples 2-1 and 2-2

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, 0.1 parts by mass of a nucleating agent, and water or a polyol compound in the amount shown in Table 2 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. It is noted here that neither water nor a polyol compound was incorporated in Comparative Example 2-1. The thus obtained pellet had a water content of about 0.008% by mass in all cases.

The pellet was dried at 60° C. for 8 hours and then used for evaluating the crystallization temperature (° C.), the flexural modulus (MPa) and the Izod impact strength (kJ/$m^2$). The dried pellet had a water content of about 0.0055% by mass. Further, the feeding property was evaluated for the olefin-based resin composition that was obtained immediately after the blending using a Henschel mixer.

TABLE 2

| | Nucleating agent | Water Polyol compound [parts by mass] | Crystal-lization temperature [° C.] | Flexural modulus [MPa] | Izod impact strength [kJ/$m^2$] | Feeding property |
|---|---|---|---|---|---|---|
| Example 2-1 | compound 2 | water 0.3 | 129.8 | 1,900 | 3.8 | good |
| Example 2-2 | compound 2 | water 0.01 | 128.3 | 1,830 | 3.8 | good |
| Example 2-3 | compound 2 | water 0.005 | 128.1 | 1,810 | 3.4 | good |
| Example 2-4 | compound 2 | water 10 | 130.1 | 1,900 | 3.8 | good |
| Example 2-5 | compound 2 | ethylene glycol 0.3 | 129.6 | 1,900 | 5.0 | good |
| Example 2-6 | compound 2 | glycerol 0.3 | 129.6 | 1,910 | 5.4 | good |
| Comparative Example 2-1 | compound 2 | — | 127.9 | 1,770 | 3.3 | good |
| Comparative Example 2-2 | compound 2 | water 13 | 129.8 | 1,900 | 3.8 | poor |

Compound 2: trade name "ADK STAB NA-21" manufactured by ADEKA Corporation (main component: a complex of hydroxyaluminum-bis[2,2'-methylene-bis(4,6-di-tert-butylphenyl)phosphate])

Examples 3-1 and 3-2, Comparative Examples 3-1 to 3-4

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, and a nucleating agent and water in the respective amounts shown in Table 3 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass in all cases. The pellet was dried at 60° C. for 8 hours and then used for evaluating the crystallization temperature (° C.). The dried pellet had a water content of about 0.0055% by mass. The results of the evaluation are shown in Table 3.

TABLE 3

| | Nucleating agent [parts by mass] | Crystallization temperature (water 0.3)*1 [° C.] | Crystallization temperature (water 0)*2 [° C.] | Difference in Crystallization Temperature*3 [° C.] |
|---|---|---|---|---|
| Example 3-1 | Compound 1 0.1 | 131.5 | 129.5 | +2.0 |
| Example 3-2 | Compound 2 0.1 | 129.8 | 127.9 | +1.9 |
| Comparative Example 3-1 | Control | 111.8 | 113.4 | −1.6 |
| Comparative Example 3-2 | HPN-20E 0.05 | 125.9 | 126.0 | −0.1 |
| Comparative Example 3-3 | NA-11 0.1 | 130.7 | 131.0 | −0.3 |
| Comparative Example 3-4 | Na benzoate 0.1 | 127.2 | 130.8 | −3.6 |

*1 Crystallization temperature with an addition of 0.3 parts by mass of water
*2 Crystallization temperature without addition of water
*3 Difference in crystallization temperature between cases with and without an addition of 0.3 parts by mass of water Control: no nucleating agent was incorporated HPN-20E: trade name "HYPERFORM HPN-20E", manufactured by Milliken & Company NA-11: trade name "ADK STAB NA-11", manufactured by ADEKA Corporation Na benzoate: sodium benzoate Examples 4-1 and 4-2, Comparative Examples 4-1 to 4-4

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, and a nucleating agent and water in the respective amounts shown in Table 4 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass in all cases. The pellet was dried at 60° C. for 8 hours and then used for evaluating the flexural modulus (MPa). The dried pellet had a water content of about 0.0055% by mass. The results of the evaluation are shown in Table 4.

TABLE 4

| | Nucleating agent [parts by mass] | Flexural modulus (water 0.3)*4 [MPa] | Flexural modulus (water 0)*5 [MPa] | Difference in flexural modulus*6 [MPa] |
|---|---|---|---|---|
| Example 4-1 | Compound 1 0.1 | 1,980 | 1,880 | +100 |
| Example 4-2 | Compound 2 0.1 | 1,900 | 1,770 | +130 |
| Comparative Example 4-1 | Control | 1,330 | 1,380 | −50 |
| Comparative Example 4-2 | HPN-20E 0.05 | 1,720 | 1,710 | +10 |
| Comparative Example 4-3 | NA-11 0.1 | 1,890 | 1,940 | −50 |
| Comparative Example 4-4 | Na benzoate 0.1 | 1,770 | 1,860 | −90 |

*4 Flexural modulus with an addition of 0.3 parts by mass of water
*5 Flexural modulus without addition of water
*6 Difference in flexural modulus between cases with and without an addition of 0.3 parts by mass of water Examples 5-1 and 5-2, Comparative Examples 5-1 to 5-4

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, and a nucleating agent and water in the respective amounts shown in Table 5 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass in all cases. The pellet was dried at 60° C. for 8 hours and then used for evaluating the HDT (° C.). The dried pellet had a water content of about 0.0055% by mass. The HDT (° C.) was evaluated by the following method. The results thereof are shown in Table 5.

<Heat Deflection Temperature Under Load HDT (° C.)>

Each pellet obtained by granulation was injection-molded using an injection molding machine (EC100-2A, manufactured by Toshiba Machine Co., Ltd.) at a mold temperature of 50° C. and a resin temperature of 200° C. to prepare a test piece having dimensions of 80 mm×10 mm×4 mm. The thus obtained test piece was left to stand for at least 48 hours in an incubator at 23° C., and the HDT (° C.) was subsequently measured in accordance with ISO75 (load: 0.45 MPa).

TABLE 5

| | Nucleating agent [parts by mass] | HDT (water 0.3)*7 [° C.] | HDT (water 0)*8 [° C.] | Difference in HDT (° C.)*9 [° C.] |
|---|---|---|---|---|
| Example 5-1 | Compound 1 0.1 | 114 | 109 | +5 |
| Example 5-2 | Compound 2 0.1 | 109 | 104 | +5 |
| Comparative Example 5-1 | Control | 80 | 82 | −2 |
| Comparative Example 5-2 | HPN-20E 0.05 | 103 | 103 | 0 |

TABLE 5-continued

| | Nucleating agent [parts by mass] | HDT (water 0.3)*7 [° C.] | HDT (water 0)*8 [° C.] | Difference in HDT (° C.)*9 [° C.] |
|---|---|---|---|---|
| Comparative Example 5-3 | NA-11 0.1 | 112 | 114 | −2 |
| Comparative Example 5-4 | Na benzoate 0.1 | 106 | 110 | −4 |

*7HDT with an addition of 0.3 parts by mass of water
*8HDT without addition of water
*9Difference in HDT between cases with and without an addition of 0.3 parts by mass of water

Examples 6-1 and 6-2, Comparative Examples 6-1 to 6-4

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, and a nucleating agent and water in the respective amounts shown in Table 6 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass in all cases. The pellet was dried at 60° C. for 8 hours and then used for evaluating the half crystallization time (sec). The dried pellet had a water content of about 0.0055% by mass. The results of the evaluation are shown in Table 6.

TABLE 6

| | Nucleating agent [parts by mass] | Half crystallization time (water 0.3)*10 [sec] | Half crystallization time (water 0)*11 [sec] | Difference in half crystallization time*12 [sec] |
|---|---|---|---|---|
| Example 6-1 | Compound 1 0.1 | 48 | 68 | −20 |
| Example 6-2 | Compound 2 0.1 | 65 | 100 | −35 |
| Comparative Example 6-1 | Control | 150< | 150< | — |
| Comparative Example 6-2 | HPN-20E 0.05 | 150< | 150< | — |
| Comparative Example 6-3 | NA-11 0.1 | 59 | 56 | +3 |
| Comparative Example 6-4 | Na benzoate 0.1 | 118 | 58 | +60 |

*10Half crystallization time with an addition of 0.3 parts by mass of water
*11Half crystallization time without addition of water
*12Difference in half crystallization time between cases with and without an addition of 0.3 parts by mass of water

Examples 7-1 and 7-2, Comparative Examples 7-1 to 7-4

With respect to 100 parts by mass of a homopolypropylene as an olefin-based resin (melt flow rate=8 g/10 min; 2.16 kg×230° C. according to ISO Standard 1133), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, the nucleating agent shown in Table 7, and water in the respective amounts shown in Table 7 were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus granulated pellet had a water content of about 0.008% by mass in all cases. The pellet was dried at 60° C. for 8 hours and then used for evaluating the haze (%). The dried pellet had a water content of about 0.0055% by mass. The results of the evaluation are shown in Table 7.

TABLE 7

| | Nucleating agent [parts by mass] | Haze (water 0.3)*13 [%] | Haze (water 0.005)*14 [%] | Difference in haze*15 [%] |
|---|---|---|---|---|
| Example 7-1 | Compound 1 0.1 | 47.0 | 61.2 | −14.2 |
| Example 7-2 | Compound 2 0.1 | 48.7 | 50.3 | −1.6 |
| Comparative Example 7-1 | Control | 90.6 | 88.0 | +2.6 |
| Comparative Example 7-2 | HPN-20E 0.05 | 62.8 | 65.3 | −2.5 |
| Comparative Example 7-3 | NA-11 0.1 | 60.8 | 51.2 | +9.6 |
| Comparative Example 7-4 | Na benzoate 0.1 | 88.9 | 70.1 | +18.8 |

*13Haze with an addition of 0.3 parts by mass of water
*14Haze with an addition of 0.005 parts by mass of water
*13Difference in haze between a case with an addition of 0.3 parts by mass of water and a case with an addition of 0.005 parts by mass of water

Example 8

Using a Henschel mixer, 60 parts by mass of "NOVATEC PP BC03B" (trade name) manufactured by Japan Polypropylene Corporation (olefin block copolymer, melt flow rate=30 g/10 min; 2.16 kg×230° C. according to ISO Standard 1133) as an olefin-based resin, 20 parts by mass of an olefin-based elastomer (trade name "ENGAGE 8200", manufactured by The Dow Chemical Company), 20 parts by mass of a filler ("CROWN TALC PP", manufactured by Matsumura Sangyo Co., Ltd.), 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, 0.3 parts by mass of a hindered amine compound (ADK STAB LA-81), 0.1 parts by mass of Compound 1, and 0.3 parts by mass of water were mixed at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass. The pellet was dried at 60° C. for 8 hours and subsequently injection-molded at 230° C. to obtain a 2 mm-thick test piece. The dried pellet had a water content of about 0.0055% by mass. The thus obtained test piece had excellent weather resistance with limited coloration, and exhibited good physical properties in terms of flexural modulus, crystallization temperature and the like. The olefin-based resin composition of the present invention can be preferably used in automotive materials.

Example 9

With respect to 100 parts by mass of a polypropylene having a melt flow rate of 3 g/10 min as an olefin-based resin, 0.05 parts by mass of a phenolic antioxidant [tetrakis[methylene-3-(3',5'-di-tert-butyl-4'-hydroxyphenyl)propionate]methane], 0.1 parts by mass of a phosphorus-based antioxidant [tris(2,4-di-tert-butylphenyl)phosphite], 0.05 parts by mass of calcium stearate, 0.05 parts by mass of Compound 1, and 0.3 parts by mass of water were mixed using a Henschel mixer at 1,000 rpm for 1 minute, and the resulting mixture was melt-kneaded using a biaxial extruder (TEX-28V; manufactured by The Japan Steel Works, Ltd.) at an extrusion temperature of 230° C. and subsequently granulated into a pellet. The thus obtained pellet had a water content of about 0.008% by mass. The pellet was dried at 60° C. for 8 hours and subsequently extrusion-molded at 230° C. to obtain a 1 mm-thick sheet. The dried pellet had a water content of about 0.0055% by mass. A cup that was thermoformed from the thus obtained sheet had good transparency and strength. The olefin-based resin composition of the present invention can be preferably used in packaging materials of food containers, beverage containers and the like.

Examples 10-1 to 10-9, Comparative Examples 10-1 and 10-2

To 100 parts by mass of "PRIME POLYPRO R720" (trade name) manufactured by Prime Polymer Co., Ltd. (olefin random copolymer, melt flow rate=12 g/10 min; 2.16 kg×230° C. according to ISO Standard 1133) as an olefin-based resin, 0.05 parts by mass of tetrakis[methylene-3-(3',5'-di-tert-butyl-4'-hydroxyphenyl)propionate]methane as a phenolic antioxidant, 0.1 parts by mass of tris(2,4-di-tert-butylphenyl)phosphite as a phosphorus-based antioxidant, 0.05 parts by mass of calcium stearate, 0.1 parts by mass of the nucleating agent shown in Table 8, and the polyol compound shown in Table 8 as an auxiliary agent in the amount shown in Table 8 were added, and these materials were mixed using a Henschel mixer at 1,000 rpm for 1 minute. The resulting mixture was melt-kneaded using a biaxial extruder (TEX-28V; manufactured by The Japan Steel Works, Ltd.) at an extrusion temperature of 230° C. and subsequently granulated into a pellet. It is noted here that neither a nucleating agent nor a polyol compound was incorporated in Comparative Example 10-1, and a polyol compound was not incorporated in Comparative Example 10-2. The thus obtained pellet was dried at 60° C. for 8 hours and then used for evaluating the crystallization temperature (° C.).

TABLE 8

| | Nucleating agent | Polyol compound [parts by mass] | Crystallization temperature [° C.] |
|---|---|---|---|
| Example 10-1 | Compound 1 | ethylene glycol 0.01 | 120.8 |
| Example 10-2 | Compound 1 | ethylene glycol 0.04 | 121.1 |
| Example 10-3 | Compound 1 | ethylene glycol 0.3 | 121.3 |
| Example 10-4 | Compound 1 | pentaerythritol 0.01 | 121.0 |
| Example 10-5 | Compound 1 | pentaerythritol 0.04 | 121.2 |
| Example 10-6 | Compound 1 | pentaerythritol 0.3 | 121.5 |
| Example 10-7 | Compound 1 | glycerol monostearate 0.01 | 120.5 |
| Example 10-8 | Compound 1 | glycerol monostearate 0.04 | 120.8 |
| Example 10-9 | Compound 1 | glycerol monostearate 0.3 | 121.1 |
| Comparative Example 10-1 | — | — | 102.7 |
| Comparative Example 10-2 | Compound 1 | — | 120.0 |

From the above, the olefin-based resin composition of the present invention was confirmed to have excellent crystallinity. In addition, it was confirmed that the olefin-based resin composition of the present invention can yield a molded article having excellent mechanical properties and transparency.

The invention claimed is:

1. A method of producing an olefin-based resin composition, the method comprising:

a preparation step of preparing an olefin-based resin not containing a nucleating agent component; and a blending step of blending a nucleating agent and an auxiliary agent into the thus prepared olefin-based resin not containing a nucleating agent component to obtain an olefin-based resin blend, wherein the nucleating agent contains an aromatic phosphate metal salt represented by the following Formula (1):

(1)

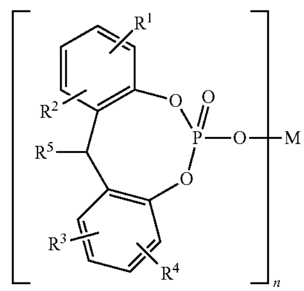

wherein, $R^1$ to $R^4$ each represent an alkyl group having 1 to 6 carbon atoms; R5 represents a hydrogen atom or an alkyl group having 1 to 3 carbon atoms; n represents 1 or 2; when n is 1, M represents lithium or dihydroxyaluminum; and when n is 2, M represents hydroxyaluminum, the auxiliary agent is water wherein the water is not in a form of a hydrate or a hydroxide, and in the blending step, 0.001 to 5 parts by mass of the nucleating agent and 0.003 to 10 parts by mass of the auxiliary agent are blended with respect to 100 parts by mass of the olefin-based resin not containing a nucleating agent component.

2. The method of producing an olefin-based resin composition according to claim 1, further comprising a melt-kneading step of melt-kneading the olefin-based resin blend obtained in the blending step to obtain an olefin-based resin composition.

* * * * *